(12) United States Patent
Phadnis et al.

(10) Patent No.: US 7,826,355 B2
(45) Date of Patent: *Nov. 2, 2010

(54) REDUCING OVERHEAD WHEN SETTING UP MULTIPLE VIRTUAL CIRCUITS USING SIGNALING PROTOCOLS

(75) Inventors: Amit S Phadnis, Bangalore (IN); Pankaj Vyas, Bangalore (IN); Balaji Lakshmikanth Bangolae, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 11/308,622

(22) Filed: Apr. 13, 2006

(65) Prior Publication Data

US 2006/0209839 A1   Sep. 21, 2006

Related U.S. Application Data

(63) Continuation of application No. 09/976,004, filed on Oct. 15, 2001, now Pat. No. 7,512,065.

(51) Int. Cl.
*G01R 31/08* (2006.01)
(52) U.S. Cl. .................... 370/230; 370/236; 370/422
(58) Field of Classification Search .............. None
See application file for complete search history.

(56) References Cited

U.S. PATENT DOCUMENTS 5,649,108 A * 7/1997 Spiegel et al. .......... 709/241
5,940,393 A   8/1999 Duree et al.
5,960,002 A * 9/1999 Ramfelt et al. .......... 370/450
6,151,635 A   11/2000 Bare
6,278,714 B1 * 8/2001 Gupta .................. 370/422
6,577,653 B1   6/2003 Rochberger et al.
7,512,065 B1 * 3/2009 Phadnis et al. .......... 370/230

OTHER PUBLICATIONS

ITU-T Recommendation Q.931 (May 1998); Entitled, "ISDN user-network interface layer 3 specification for basic call control"; Available from www.atmforum.com; (345 pages).

ITU-T Recommendation Q.2931 (Feb. 1995); Entitled: "Broadband Integrated Services Digital Network (B-ISDN)—Digital Subscriber Signalling System No. 2(DSS 2)—User-Network Interface (UNI) Layer 3 Specification for Basic Call/Connection Control"; Available from www.atmforum.com; (279 pages).

The ATM Forum Technical Committee; Entitled: "ATM User-Network Interface (UNI) Signalling Specification, Version 4.0"; AF-SIG-0061.000; Jul. 1996; Available from www.atmforum.com; (136 pages).

* cited by examiner

*Primary Examiner*—Robert W Wilson
(74) *Attorney, Agent, or Firm*—Patent Capital Group

(57) ABSTRACT

Setting up a group of virtual circuits using a single set up message request. In an embodiment, fewer than all of the virtual circuits in the group are immediately provisioned, and the remaining virtual circuits are placed in an inactive status by appropriate configuration of all the devices in the path of the group of virtual circuits. Each of the inactive virtual circuits can be activated (complete provisioning) as and when required. The bandwidth overhead on the networks is reduced as fewer signaling messages would be used in provisioning several virtual circuits. The parsing overhead is reduced on the devices processing the signaling messages as a result.

12 Claims, 5 Drawing Sheets

REDUCING OVERHEAD WHEN SETTING UP MULTIPLE VIRTUAL CIRCUITS USING SIGNALING PROTOCOLS

RELATED APPLICATIONS

The present application claims priority from and is a continuation of co-pending application Ser No.: 09/976,004, filed on Oct. 15, 2001, having the same title as the subject patent application, and is incorporated in its entirety into the present application.

The present application is also related to the co-pending application entitled, "Providing Differentiated Services on ATM Switched Virtual Circuits When Transporting IP Packets", Ser. No. 09/904,593, filed on Jul. 30, 2001 (hereafter "RELATED APPLICATION"), which is incorporated in its entirety herewith.

BACKGROUND OF THE INVENTION

1. Field of the Invention

The present invention relates to telecommunication networks, and more specifically to a method and apparatus for reducing overhead when setting up multiple virtual circuits between two network devices using signaling protocols.

2. Related Art

Virtual circuits are often provided between network devices. A virtual circuit generally defines a path (including intermediate devices and transmission paths) traversed by data packets from one network device to the other. The network devices at either end of the virtual circuit are generally referred to as end systems.

Signaling protocols are often used to set up and terminate (manage, in general) virtual circuits as is well known in the relevant arts. Overhead in terms of both bandwidth usage and processing overhead exists when setting up virtual circuits using signaling messages (often sent using multiple packets).

The bandwidth usage is due to the transfer of signaling messages (in the form of packets) as a part of the signaling task. The processing overhead is present on the intermediate devices and the end systems. The processing overhead may be of particular concern when the packets (containing signaling messages) need to be parsed by the systems, as described below with reference to ATM (asynchronous transfer mode) environments.

As is well known, the signaling related messages of ATM environments contain information elements. Each information element specifies parameters (e.g., quality of service) related to the virtual circuit being managed. Each device in the path of the virtual circuit typically needs to examine and potentially act upon the information elements to appropriately support the virtual circuit.

Accordingly, the signaling messages transferred during set up and termination of virtual circuits may cause at least some level of overhead on each of the devices in the virtual circuit path. The overhead could be unacceptably high if a large number of virtual circuits (e.g., switched virtual circuits) are being set up and terminated. In other words, the devices may not scale to support a large number of virtual circuits.

Therefore, what is needed is a method and apparatus which reduces overhead when setting up multiple virtual circuits between two network devices using signaling protocols.

SUMMARY OF THE INVENTION

The present invention minimizes the bandwidth usage on communication links and processing overhead on devices when provisioning multiple virtual circuits. A single set up message can be sent from a first end system (at which the virtual circuits terminate) to cause a group of virtual circuits to be set up. Switches positioned between the two end systems propagate (send) the acceptance message to cause the virtual circuit to be set up end to end. Similarly, an acceptance message is generated by the second end system, which is propagated back to the first end system by the switches.

In an embodiment, fewer than all of the requested number of virtual circuits are provisioned immediately in response to the set up message. The set up message contains traffic parameters for all the virtual circuits. Even the virtual circuits which are not completely provisioned (not-yet provisioned virtual circuits), may be configured with the corresponding traffic parameters.

Any of the not-yet-provisioned virtual circuits may be activated by sending additional signaling messages. The message formats allow for multiple virtual circuits to be addressed and managed (e.g., released, activated and set up) in a single message. Due to the sharing of the traffic parameters for many virtual circuits, and by using fewer signaling messages, the bandwidth overhead on communication links and the processing overhead on the individual devices may be minimized.

Another aspect of the present invention allows network to be operational even in the presence of devices which do not support the set up of groups of virtual circuits. To facilitate such a feature, an embodiment (implemented using UNI/NNI protocols) incorporates non-mandatory (which can be ignored) information elements to transmit the group related information. Another information element which requests set up of a single virtual circuit is also contained in the set up messages.

As a result, a device which does not support groups merely ignores the information element related to groups, but processes the information element related to a single virtual circuit and sends acceptance for the single virtual circuit. In other words, a single virtual circuit may be set up when all the devices in the path do not support the set up of a group of virtual circuits.

To support groups of virtual circuits, a device may maintain a bundle structure associated with each group. The bundle structure stores information identifying the specific virtual circuits forming the corresponding group. The device may further maintain a call reference structure associated with each call, with the call reference structure indicating the status (in the processing of being set up, accepted, etc.) of the call on which the group of virtual circuits are provisioned and managed.

A per-VC structure may also be maintained associated with each virtual circuit. The per-VC structure may store information related to the call parameters accepted for the corresponding virtual circuit. Thus, when a device corresponds to an edge router, bundle structures, call reference structures, and per-VC structures may be maintained in the edge router.

In case a device corresponds to a switch positioned between the two end systems, switch structures may be maintained in addition. The switch structures enable a switch to translate an incoming circuit identifier to an outgoing circuit identifier.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A device in accordance with the present invention requests a group of virtual circuits to be set up using a single signaling set up message. Parameters related to multiple virtual circuits may also be sent in the signaling set up message. All the devices (including the other end system) may associate the parameters with all the virtual circuits. In an embodiment described below, the single message specifies parameters for virtual circuits which are to be set up potentially in future.

As a result, the devices in the path of the virtual circuit may merely need to examine one packet to determine several aspects of many virtual circuits. Consequently the overhead on the devices may be reduced. In addition, the number of packets transmitted on a network backbone may also be reduced.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
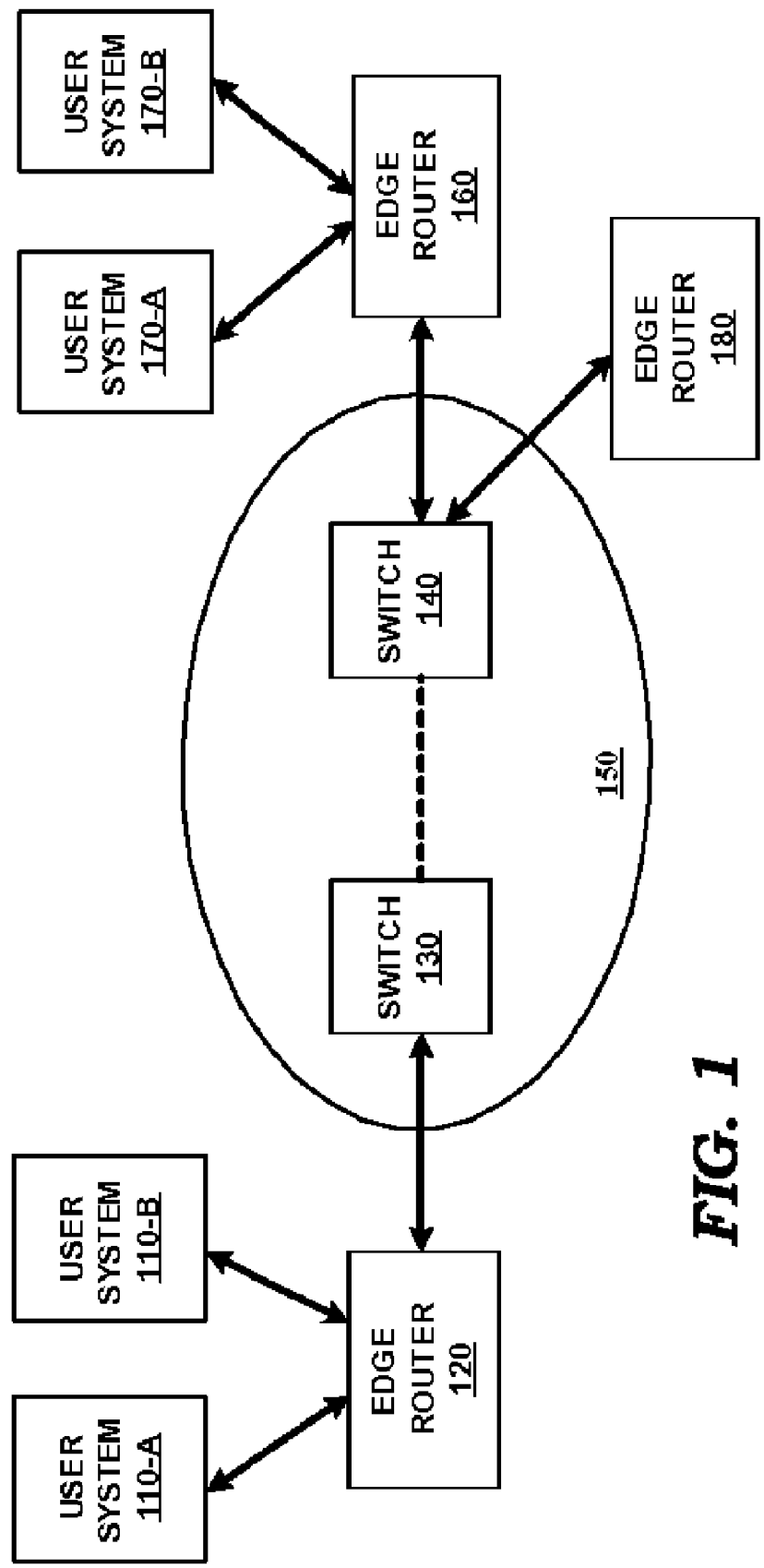
FIG. 1 is a block diagram illustrating an example environment in which the present invention can be implemented.

FIG. 1 is a block diagram illustrating an example environment in which the present invention can be implemented. The environment is shown containing user systems 110-A, 110-B, 170-A and 170-B, edge routers 120, 160 and 180, and switches 130 and 140 in ATM backbone 150. The environment is shown containing a few representative components only for illustration. In reality, each environment typically contains many more components. Each component is described below in further detail.

User systems 110-A, 110-B communicate with user systems 170-A and 170-B using ATM backbone 150. Each user system (e.g., 110-A) interfaces with the connected (e.g., user system 110-A is shown connected to edge router 120) edge router(s) using a protocol such as Internet Protocol (IP). Each user system may correspond to a computer system or workstation, and can be implemented in a known way.

ATM backbone 150 is shown containing switches 130 and 140. Switches 130 and 140 operate consistent with the ATM protocol, and may be implemented in a known way. In general, switches enable edge routers 120, 160 and 180 to communicate with each other using ATM protocol. In an embodiment, switches use NNI protocol for signaling the management of the various virtual circuits.

Edge router 120 interfaces with user systems 110-A and 110-B using IP protocol, and with switch 130 using ATM. Edge router 120 may use several virtual circuits to communicate with each of the other edge routers 160 and 180. UNI protocol may be used for interfacing with switch 130 to manage the virtual circuits. In embodiment(s) described in RELATED APPLICATION noted above, differentiated services are provided to user applications by provisioning several switched virtual circuits to the same edge router.

For illustration, it is assumed that edge router 120 needs to initiate virtual circuits to other edge routers 160 and 180. Edge router 120 may dynamically (as and when required) establish and release several switched virtual circuits using signaling protocols. When a large number of switched virtual circuits are established and released, the overhead due to the signaling messages may be unacceptably high on the devices forming the virtual circuit path.

The overhead is reduced by using a single signaling message which communicates several information elements (IEs). The manner in which the overhead may be minimized is described below first with reference to edge router 120 (which initiates the group of VCs), and then with reference to other devices in the path of the virtual circuit.

3. Method of Initiating a Group of Virtual Circuits

Figure 2:
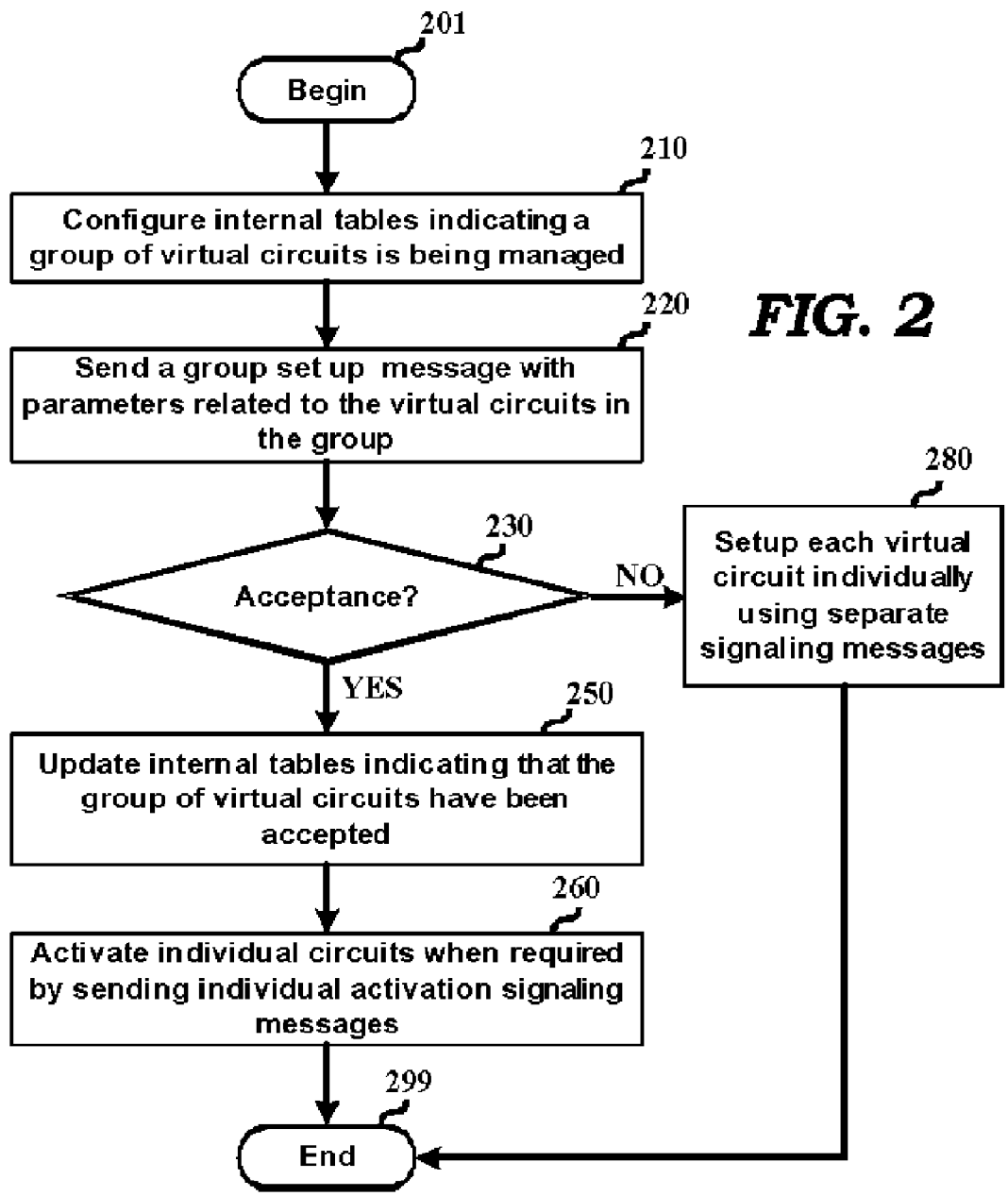
FIG. 2 is a flow chart illustrating a method using which an end system may initiate and set up a group of virtual circuits according to an aspect of the present invention.

FIG. 2 is a flow-chart illustrating a method using which edge router 120 may set up several virtual circuits in an embodiment of the present invention. The method begins in step 201, in which control immediately passes to step 210. In step 210, edge router 120 configures internal entries indicating that a group of virtual circuits is being managed. The configuration generally needs to be consistent with the protocol interface with other devices in the path of the virtual circuits. An example implementation of edge router 120 is described below.

In step 220, edge router 120 sends a group set up request message with parameters related to several virtual circuits in the group. Setting up the virtual circuits merely requires some level of configuration in devices in the path of the virtual circuits. Completion of provisioning can occur much later as and when required, as described below. In response to a group set up request, edge router 120 receives a group acceptance message if all the devices in the path support virtual circuit groups.

In step 230, edge router 120 checks whether an acceptance message is received in response to the group set up message sent in step 220. In an embodiment described below, the acceptance message is also used to indicate that the first one of the virtual circuits has been provisioned. The remaining virtual circuits are placed in an inactive status. Control passes to step 250 if an acceptance message is received, and to step 280 otherwise.

In step 280, each individual virtual circuit is set up individually as the feature of supporting group of virtual circuits is not supported by at least by one device in the virtual circuit path. In an embodiment described below, the not-accepted message is also used to indicate that the first one of the virtual circuits has been provisioned.

In step 250, edge router 120 updates internal tables indicating that the group of circuits have been accepted by the remaining devices in the path to edge router 160. In the embodiment noted above, the first one of the virtual circuits is indicated to be provisioned successfully.

In step 260, the individual circuits are provisioned potentially as and when required by sending the individual signaling set up messages. As the parameters related to each of the circuits are already communicated (and potentially configured in the other devices once prior to activation), the overhead may be minimized on backbone 150 and the devices (both switches and edge routers). The description is continued with respect to a method using which a receiving end system may provide a group of virtual circuits in accordance with various aspects of the present invention.

4. Method of Processing a Group Set Up Message

Figure 3:
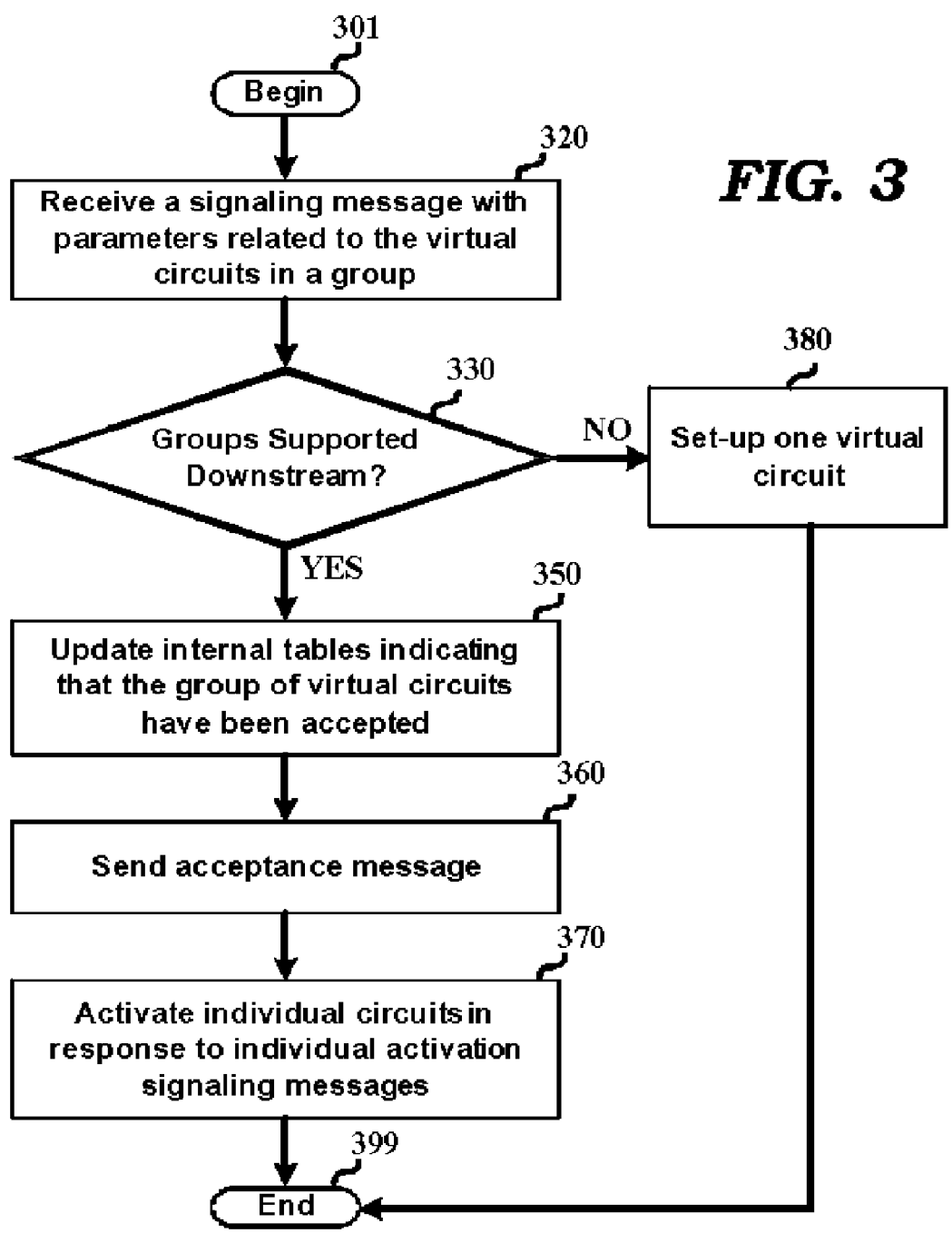
FIG. 3 is a flow chart illustrating a method using which an end system processes group set up requests received from another end system.

FIG. 3 is a flow chart illustrating a method using which a device (switch or edge router) may process a group set up message received from other devices. The method is described with reference to edge router 160 for illustration. However, many aspects of the method may be implemented in intermediate devices in the path of the group of virtual circuits. The method starts in step 301, in which control immediately passes to step 320.

In step 320, edge router 160 receives a group set up message from switch 140. The message may be received in a known way. In step 330, edge router 160 determines whether groups of virtual circuits are supported. If the groups are supported control passes to step 350, otherwise control passes to step 380.

In step 350, the internal tables are updated to indicate that the group of virtual circuits have been accepted. All the indicated virtual circuits may be provisioned, except that the virtual circuits may be marked as being inactive (and thus cannot be used). In step 360, an acceptance signaling message is sent to switch 140, which is propagated by each intermediate device to edge router 120.

In step 370, edge router 160 activates individual circuits in response to activation signaling messages. In an embodiment, an activation message is sent to activate each virtual circuit. Either of the edge routers 120 or 160 may activate the individual virtual circuits. However, a single activation message can be designed to activate multiple virtual circuits. In step 380 also, an individual virtual circuit may be set up potentially with the indication that the group of virtual circuits are not supported.

Thus, by designing the edge routers and the intermediate devices in the path of the group of virtual circuits according to a consistent protocol, the overhead may be minimized on all components supporting a virtual circuit. The description is continued with specific aspects of the described methods in an embodiment implemented using UNI and NNI protocols. The details of UNI and NNI as relevant to an understanding of the described embodiment(s) is described first.

5. Signaling Using UNI and NNI in General

Edge routers interface with switches at the edge using protocols such as UNI (User to Network Interface 3.1 or 4.0) during signaling. The interface between switches may be implemented using protocols such as NNI (network to network interface) during signaling. In general, both the types of signaling messages contain information specifying the parameters used in provisioning the virtual circuits. For example, a typical signaling set up message using UNI/NNI includes information elements identifying the called party, service parameters, etc.

All the devices (edge router 160 and switches 130, 140) in the path of the group of virtual circuits may need to parse and examine the information elements for each of the signaling set up messages. The present invention enables the resulting overhead to be minimized as described below in further detail. The description is continued with reference to the manner in which a request for a group of virtual circuits may be initiated by edge router 120.

6. Initiating Request for Group of Virtual Circuits

In an embodiment, edge router 120 sends a group set up request including a unique call reference number to switch 130. The call reference number uniquely identifies the group of virtual circuits, and may be used to identify the group when sending additional signaling messages. In response, switch 130 sends an acceptance response for the group or a single virtual circuit if the corresponding resources are available in the devices forming the virtual circuit.

In an embodiment, the format (including information elements) of group set up request is designed such that a device (switch or edge router) may be able to ignore the portions related to groups (as optional non-mandatory information elements), and indicate acceptance for a single virtual circuit.

Thus, edge router 120 receives an acceptance message for the requested group or a single virtual circuit in most circumstances. The acceptance of a single virtual circuit may be viewed as absence of support for groups of virtual circuits. In case of an acceptance message, edge router 120 may receive from switch 130 a bundle identifier, which uniquely identifies the group of virtual circuits globally in all switches and edge routers. That is, the bundle structure is not translated (as could call reference value be translated) as the value is semantically propagated by the switches.

The manner in which switches 130 and 140 may support such sequence of transactions is described below.

7. Support in Switches

Switch 130 receives a group set up message and semantically propagates the information (in the received message) to a subsequent switch (here switch 140) in the connection path. That is, in the case of NNI, the information is propagated in the form of information elements, typically with appropriate substitutions. For example, the individual VPI/VCI fields may be replaced to reflect the specific numbers corresponding to the path between the two switches.

Switch 130 waits for a response message from switch 140 after propagating the group set up message. A message indicating that the call set up is in progress may be sent to edge router 120 as is done at least by systems in conformance with UNI 3.1/4.0 specification well known in the relevant arts. Once an acceptance message is received from switch 140, the same information may again be semantically propagated (sent) to edge router 120.

Various formats may be used for the set up and acceptance messages. An example format is described below.

8. Message Format

A desirable feature is often that the improvements be backward compatible with implementations not supporting the improvements. Accordingly, an aspect of the present invention takes advantage of the fact that intermediate switches (and edge routers not initiating the group set up messages) can ignore non-mandatory information elements.

In an embodiment, a group set up message differs from conventional set up messages in that a new (non-mandatory) information element is designed which includes the information related to the virtual circuits in the group. The format of the information element can be chosen as follows:

Byte 0: Information element identifier (which would confirm that the information element is non-mandatory). Any presently unused value may be selected (after approval by the relevant standards committee).

Bytes 1-2: Control information (with the first bit allowing for use of additional bytes as control information if necessary)

Bytes 3-4: Length of information element

Bytes 5-6: Bundle identifier (described in further detail in the immediate section below)

Byte 7: First bit indicates whether the following information is related to a range of virtual circuits or a single virtual circuit. The remaining bits indicate the type (e.g., activating one of the prior requested virtual circuits in a group, changing the parameters for the virtual circuits specified below, release of virtual circuits, release of the entire group, etc.).

If the first bit of byte 7 indicates that the information element relates to only one virtual circuit, the following format may be used.

Bytes 8-9: VPI/VCI

Byte 10—(Specified by length): Traffic parameters akin to those specified in conventional single virtual circuits, which would generally define the QOS provided by the individual virtual circuits If the first bit of byte 7 indicates that the information element relates to a range of virtual circuits, the following format may be used.

Bytes 8-9: VPI/VCI of the first virtual circuit in the range

Bytes 10-11: VPI/VCI of the last virtual circuit in the range

Byte 12—(Specified by length): Traffic parameters for the entire range

The manner in which the packet format of above may be used is described below with an example.

9. EXAMPLE

To request a group of virtual circuits, edge router 120 constructs a group set up message with an information element ("new information element") of the format noted in the previous section. A unique call identifier may be associated with the set up message. The bundle identifier may be initially set to zero, and switch 130 may determine a unique identifier and send the determined identifier to edge router 120. The bundle identifier may be used in all subsequent messages related to the group of virtual circuits.

In an embodiment, a conventional information element which requests a single virtual circuit is included in addition to the new information element. Thus, to request two virtual circuits, bit 1 of byte 7 of the new information element would be set to indicate that only one new virtual circuit is addressed by the new information element. If more than two virtual circuits are to be contained in the group, bit 1 of byte 7 of the new information element may indicate that the information element relates to a range of virtual circuits.

Switch 130 propagates (sends) semantically equal message to switch 140, which in turn propagates the set up message to edge router 160. Once edge router 160 sends an acceptance message, the acceptance message is propagated back to edge router 120. In an embodiment, the acceptance message is sent using the same format as the new information element described in the previous section.

The acceptance message may use the same format as the set up message (including the new information element). The traffic parameters in the acceptance message then reflect the accepted parameters. That is, the virtual circuits may be set up with different parameters than those requested, and the set up parameters are communicated back to edge router 120.

In addition, as in the set up request message, a conventional information element may be received which indicates that the first one of the group of virtual circuits has been accepted in the virtual circuit path. The remaining virtual circuits may need to be set up using the new information element described above. A range of virtual circuits can potentially be activated in a single message. The virtual circuits set up, but not yet activated, can be activated by edge routers at either end of the virtual circuits.

In case any of the devices in the virtual circuit path do not support group of virtual circuits, the corresponding device may ignore the new information element (as being non-mandatory) and accept a single virtual circuit corresponding to the conventional information element. Accordingly, a response message (propagated back to edge router 120) would indicate that only one virtual circuit has been accepted.

While the setting up of groups of virtual circuit is described in detail, the embodiments can be extended to support the release of the virtual circuits as well. Message format similar to those described above for set up (but with the type field different) can be used to release a single virtual circuit, a range of virtual circuits, or the entire group.

Thus, using the approaches described above a group of virtual circuits can be set up and managed. To support the transactions described above, the switches and the edge routers may need to maintain various types of information. The different structures which may need to be maintained are described below.

10. Structures

The information which may need to be maintained is described first with reference to switch 130. Broadly, four structures may need to be maintained—(1) call reference structures; (2) switch structures; (3) bundle structures; and (4) per-VC structures. The manner in which each type of structure can be used is described below.

With reference to call reference structures, a call reference structure is maintained for each call (whether for a group or an individual virtual circuit). Thus, when switch 130 receives a group set up related message, the call reference structures are examined to determine that the received message is related to a new call. For each new call, a corresponding call reference structure is created.

Each call reference structure points to the corresponding switch structures and bundle structures described below. In addition, each call reference indicates the status (e.g., set up in progress or complete) of the call, whether the call is set up for a group, and status (active or inactive) of the virtual circuits if set up for a group.

Switch structures contain a mapping of incoming VPI/VCI to an outgoing connection identifier. In case the next hop is also an ATM network, the outgoing connection identifier also represents a VPI/VCI as is well known in the relevant arts. Each switch structure may also point to the corresponding bundle structure and the per-VC structure.

Each bundle structure indicates the specific virtual circuits forming the group, and the status of individual virtual circuits such as whether the virtual circuit is merely in inactive status or has been provisioned. Each bundle structure points to the corresponding per-VC structures and the call reference structure.

Each per-VC structure indicates the various parameters with the corresponding virtual circuit is set up. Thus, when a group set up message is sent (received), the requested parameters are stored in the related per-VC structures(s). When an acceptance message is received (sent), the parameters are updated consistent with the information in the acceptance message. Thus, it may be appreciated that the parsing overhead is minimized when multiple virtual circuits need to be provisioned between two end systems.

While each switch (130 and 140) may maintain the four types of structures noted above, the edge routers (120, 160, and 180) merely need to maintain the bundle structures, per VC structures and call reference structures. Several embodiments of switches and edge routers may be implemented using the format and approaches described above. It should be understood that each feature of the present invention can be implemented in a combination of one or more of hardware, software and firmware.

In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing edge router 120 with a desired mix of hardware, software and/or firmware. An example embodiment implemented substantially in software is described first. Another embodiment implemented more in hardware is described then.

11. Software Implementation

Figure 4:
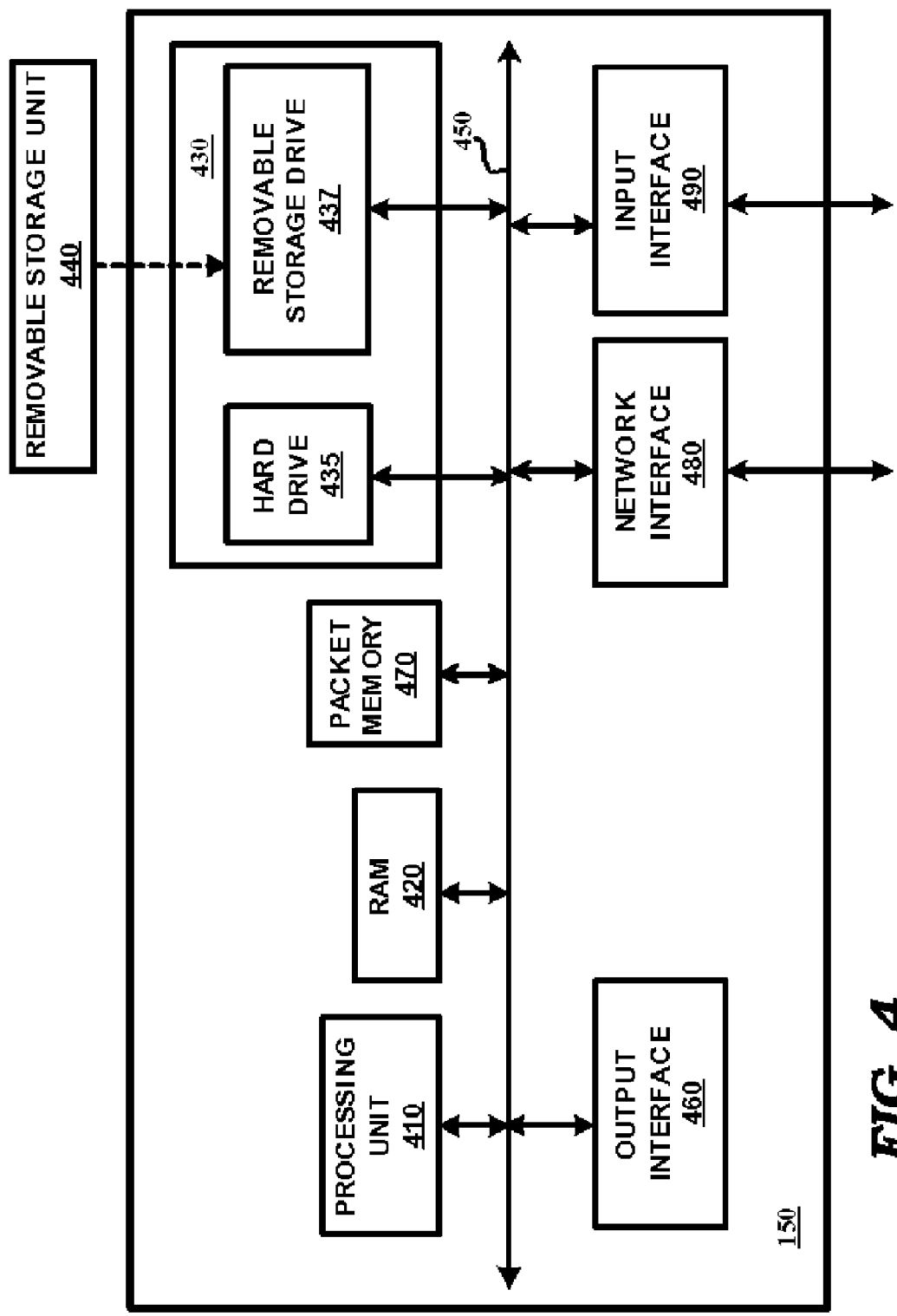
FIG. 4 is a block diagram illustrating the details of an embodiment of a device implemented substantially in the form of software according to an aspect of the present invention.

FIG. 4 is a block diagram illustrating the details of device 400 in one embodiment. Device 400 may correspond to one of edge routers 120, 160 and 180, and switches 130 and 140. Device 400 is shown containing processing unit 410, random access memory (RAM) 420, storage 430, output interface 460, packet memory 470, network interface 480 and input interface 490. Each component is described in further detail below.

Output interface 460 provides output signals (e.g., display signals to a display unit, not shown) which can form the basis for a suitable user interface for an administrator to interact with device 400. Input interface 490 (e.g., interface with a key-board and/or mouse, not shown) enables an administrator to provide any necessary inputs to device 400. Output interface 460 and input interface 490 can be used, for example, to enable a network administrator to enable/disable various features provided in accordance with the present invention.

Network interface 480 enables device 400 to send and receive data on communication networks using asynchronous transfer mode (ATM) and any other protocols (e.g., SS7, PNNI, well known in the relevant arts) device 400 may be using. Network interface 480, output interface 460 and input interface 490 can be implemented in a known way.

RAM 420, storage 430, and packet memory 470 may together be referred to as a memory. RAM 420 receives instructions and data on path 450 from storage 430, and provides the instructions to processing unit 410 for execution. In addition, RAM 420 may be used to implement tables of each of the types of structures (call reference, switch, per-VC, and bundle) described above as necessary for the specific type of device.

Packet memory 470 stores (queues) cells/packets received and/or waiting to be forwarded (or otherwise processed) on different ports. Storage 430 may contain units such as hard drive 435 and removable storage drive 437. Storage 430 may store the software instructions and data, which enable device 400 to provide several features in accordance with the present invention.

Some or all of the data and instructions may be provided on removable storage unit 440, and the data and instructions may be read and provided by removable storage drive 437 to processing unit 410 via RAM 420. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

Embodiments according to FIG. 4 can be used to implement switches and routers which facilitate the set up and management (including release) of a group of virtual circuits. Alternative embodiments can be implemented using more hardware as described below. Embodiment(s) of edge routers are described first. Then, embodiment(s) of switches are described.

12. Edge Routers

Figure 5:
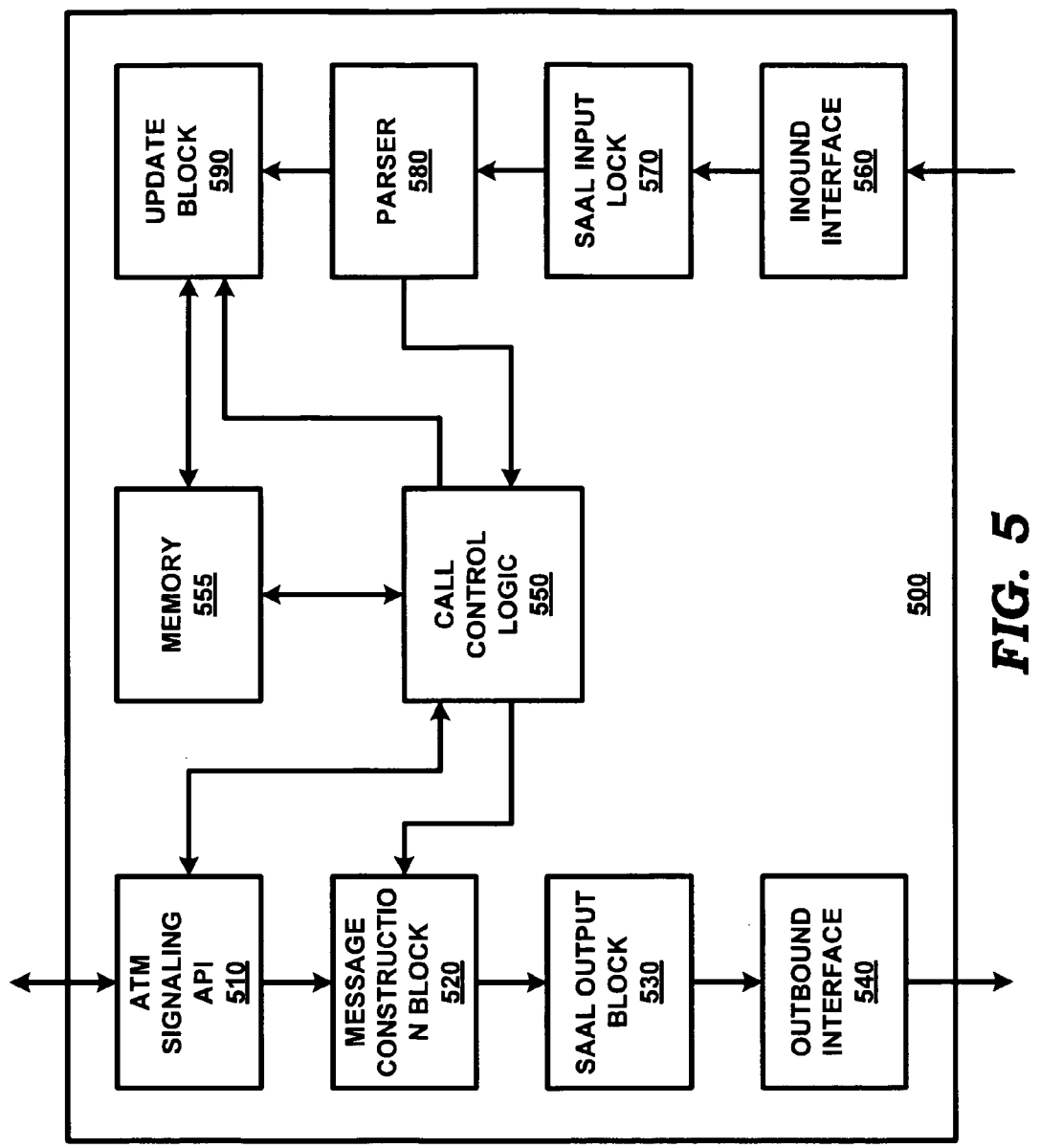
FIG. 5 is a block diagram illustrating the details of an embodiment of a device implemented substantially in the form of integrated circuit according to an aspect of the present invention.

FIG. 5 is a block diagram illustrating the details of an embodiment of device 500 as relevant to various aspects of the present invention. For the purpose of present section, device 500 is assume to correspond to edge router 120. Device 500 is shown containing ATM signaling API (application program interface) 510, message construction block 520, SAAL (signaling ATM adaptation layer) output block 530, outbound interface 540, call control logic 550, memory 555, inbound block 560, SAAL input block 570, parser 580, and update block 590. Each block is described in detail below.

Memory 555 stores the call reference structures, bundle structures, and per-VC structures, which respectively contain information on calls, groups of virtual circuits, and each virtual circuit respectively. Even though shown as one unit, memory 555 may be implemented as multiple units, with each unit being partitioned to store a portion of the information for reasons such as throughput performance.

Call control logic 550 may be viewed as implementing a finite state machine (FSM) using memory 555 to store the state information. The FSM may be designed to manage the states of various groups of virtual circuits provided in accordance with the present invention. Thus, when a group set up request is sent, the corresponding call reference structure and the bundle structure may be initialized.

When the individual circuits are activated (or released), the corresponding per-VC structure is also set up (or removed) or modified as appropriate. The operation and implementation of call control logic 550 may be further clearly appreciated by understanding the manner in which call control logic 550 control the other blocks.

Outbound interface 540 provides the physical and electrical interface required for edge router 120 to send cells on physical link to switch 130. Similarly, inbound interface 560 provides the physical and electrical interface required for edge router 120 to receive cells from switch 130. Inbound interface 560 and outbound interface 540 may be implemented in a know way.

ATM signaling API 510 may receive requests for setting up (and release) groups and then for individual virtual circuits within a group from external applications (not shown). ATM signaling API 510 passes the requests to call control logic 550. If/when the status of the processing of the requests is to be communicated to the corresponding applications, ATM signaling API 510 receives the corresponding status messages from call control logic 550, and passes the messages to the corresponding external applications.

Message construction block 520 forms the various messages (e.g., group set up request, activation of individual virtual circuits, and release) under the control of call control logic 550. The messages can be formed according to the formats and conventions described in the above sections.

SAAL output block 530 receives the messages generated by message construction block 520, and ensures delivery of each message in the form of potentially multiple cells by interfacing with outbound interface 540.

SAAL input block 570 receives from inbound interface 560 cells forming messages (set up messages and virtual circuit related messages initiated by other edge routers), and forwards the messages to parser 580. Parser 580 parses the incoming messages to determine the specific type of message and the related parameters. The type determination and related parameters are forwarded to call control logic 550. SAAL output block 530, SML input block 570 and parser 580 may be implemented in a known way.

Update block 590 updates the structures in memory 555 under the control of call control logic 550 (in response to various signaling messages). When an acceptance message indicates that a group of virtual circuits are accepted, the corresponding bundle structure and per-VC structures are updated to reflect the status (and the accepted parameters). Similarly, the bundle structure and per-VC structures are updated when the individual virtual circuits are released. The call structure is updated when the call is set up and the entire bundle is released.

Thus, the description of above illustrates the manner in which an edge router initiating a request for group of virtual circuits can be implemented. The edge router at the other end also can be implemented using the same blocks. Assuming now that edge router 160 initiates a request for a group of virtual circuits to edge router 120, the manner in which the embodiment of FIG. 5 may process the messages is described below.

Call control logic 550 receives the set up request message including a call reference number and information elements (including a bundle identifier) as described above. Call control logic 550 initiates a new bundle structure, a new call structure and a new per-VC structure (assuming only one virtual circuit is accepted). Call control logic 550 interfaces with message construction block 520 to cause the corresponding response messages to be generated as described in the previous sections.

Thus, edge routers provided in accordance with the present invention support a group of virtual circuits as described above. The manner in which cooperative switches may be implemented is described below with examples.

13. Switches

The operation and implementation of switches is described now with reference to FIG. 5. For the purpose of the present section, device 500 is assumed to represent switch 130 (or 140). Only the significant differences of switch 130 in relation to edge router 120 are described below for conciseness.

Memory 555 may store switch structures (which translate incoming circuit identifier to an outgoing identifier) for the virtual circuits passing through switch 130, in addition to the three types of structures noted above.

Call control logic 550 interfaces with message construction block 520 to semantically propagate the request and response messages further down the connection path. In addition, call control logic 550 interfaces with update block 590 to create/update the four types of structures according to the status of various groups and the individual virtual circuits. The switch structures are created when the corresponding set up messages are semantically propagated. The switch structures are removed when the corresponding release signaling messages are received.

Thus, using a combination of the concepts and approaches described above, several switches and edge routers may be implemented in accordance with the present invention. The bandwidth usage on ATM backbone 150 and the overhead on the devices in the path of multiple virtual circuits can be minimized.

14. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of setting up virtual circuits between a first end system and a second end system connected by a network, said method being performed in said first end system, said method comprising:

sending to said second end system a single signaling message requesting a plurality of virtual circuits to be provisioned to said second end system, each of said plurality of virtual circuits terminating at said first end system and said second end system, the single signaling message including traffic parameters for the virtual circuits regardless of a provisioning status of the virtual circuits, wherein the traffic parameters include a quality of service to be applied to the virtual circuits; and receiving an acceptance message in response to sending said single signaling message, said acceptance message indicating that fewer than said plurality of virtual circuits are provisioned to said second end system from said first end system, in response to said single signaling message, wherein the single signaling message includes a first information element corresponding to a grouping of some of the virtual circuits, and a second information element corresponding to a selected one of the virtual circuits, and wherein the first information element is not supported by at least one device between the first end system and the second end system such that the first information element is ignored by the device.

2. The method of claim 1, wherein only the acceptance message is received in response to said single signaling message.

3. The method of claim 2, wherein said fewer than said plurality of virtual circuit equals one virtual circuit only if any of a plurality of switches in a connection path between said first end system and said second end system is designed not to support request for multiple virtual circuits in a single signaling message, whereby said acceptance message indicates that a said single virtual circuit is set up.

4. The method of claim 3, wherein said receiving receives another acceptance message indicating all of said plurality of virtual circuits are provisioned between said first end system and said second end system if said plurality of switches are designed to support request for multiple virtual circuits in said single signaling message.

5. A non-transitory computer readable medium storing one or more processor executable instructions for causing a first end system to set up virtual circuits to a second end system connected by a network, wherein execution of the one or more sequence of instructions by one or more processor contained in said first end system performs the following steps:

sending to said second end system a single signaling message requesting a plurality of virtual circuits to be provisioned to said second end system, each of said plurality of virtual circuits terminating at said first end system and said second end system, the single signaling message including traffic parameters for the virtual circuits regardless of a provisioning status of the virtual circuits, wherein the traffic parameters include a quality of service to be applied to the virtual circuits; and receiving an acceptance message in response to sending said single signaling message, said acceptance message indicating that fewer than said plurality of virtual circuits are provisioned to said second end system from said first end system, in response to said single signaling message, wherein the single signaling message includes a first information element corresponding to a grouping of some of the virtual circuits, and a second information element corresponding to a selected one of the virtual circuits, and wherein the first information element is not supported by at least one device between the first end system and the second end system such that the first information element is ignored by the device.

6. The non-transitory computer readable medium of claim 5, wherein only the acceptance message is received in response to said single signaling message.

7. The non-transitory computer readable medium of claim 6, wherein said fewer than said plurality of virtual circuit equals one virtual circuit only if any of a plurality of switches in a connection path between said first end system and said second end system is designed not to support request for multiple virtual circuits in a single signaling message, whereby said acceptance message indicates that a said single virtual circuit is set up.

8. The non-transitory computer readable medium of claim 7, wherein said receiving receives another acceptance message indicating all of said plurality of virtual circuits are provisioned between said first end system and said second end system if said plurality of switches are designed to support request for multiple virtual circuits in said single signaling message.

9. A first end system communicating to a second end system connected by a network, said first end system comprising:

an outbound interface coupled to said ATM network;

a message construction block coupled to said outbound interface;

a call control logic to cause said message construction block to construct a first signaling message requesting a first plurality of virtual circuits to be set up, and to send said first signaling message on said network to said second end system, the single signaling message including traffic parameters for the virtual circuits regardless of a provisioning status of the virtual circuits, wherein the traffic parameters include a quality of service to be applied to the virtual circuits; and wherein said first signaling message is a single signaling message; and an inbound interface designed to receive an acceptance message in response to sending said single signaling message, said acceptance message indicating that fewer than said plurality of virtual circuits are provisioned to said second end system from said first end system, in response to said single signaling message, wherein the single signaling message includes a first information element corresponding to a grouping of some of the virtual circuits, and a second information element corresponding to a selected one of the virtual circuits, and wherein the first information element is not supported by at least one device between the first end system and the second end system such that the first information element is ignored by the device.

10. The first end system of 9, wherein the said inbound interface receives only the acceptance message in response to said single signaling message.

11. The first end system of claim 10, wherein said inbound interface designed to receive on said network a first acceptance message indicating that only said single virtual circuit is set up if any of a plurality of switches in a connection path between said first end system and said second end system is designed not to support request for multiple virtual circuits in a single signaling message.

whereby said acceptance message indicates that a said single virtual circuit is set up.

12. The first end system of claim 11, wherein said inbound interface is designed to receive another acceptance message indicating all of said plurality of virtual circuits are provisioned between said first end system and said second end system if said plurality of switches are designed to support request for multiple virtual circuits in said single signaling message.

* * * * *